United States Patent [19]

Obeda

[11] 3,969,544
[45] July 13, 1976

[54] METHOD FOR PLATING METALLIC WORKPIECES, PARTICULARLY ALUMINUM

[75] Inventor: Edward G. Obeda, Brookfield, Conn.

[73] Assignee: Branson Ultrasonics Corporation, New Canaan, Conn.

[22] Filed: Feb. 14, 1975

[21] Appl. No.: 549,894

[52] U.S. Cl................................ 427/57; 228/262; 427/319; 427/433
[51] Int. Cl.² ........................................ B23K 35/12
[58] Field of Search............... 427/57, 319, 433; 29/502; 228/262

[56] References Cited
UNITED STATES PATENTS 2,397,400  3/1946  Barwill ........................ 427/57 X
3,680,200  8/1972  Terrill et al. .................. 228/262 X

*Primary Examiner*—Michael R. Lusignan
*Attorney, Agent, or Firm*—Ervin B. Steinberg; Philip J. Feig

[57] ABSTRACT

This invention discloses the plating of a metallic workpiece, particularly aluminum with a layer of tin. The plating is accomplished in the presence of sonic or ultrasonic vibrations at a temperature determined by the phase diagram for a binary alloy to provide for the presence of an alloy interface encompassing both metals. This contrasts with the heretofore achieved adhesive bond.

8 Claims, 1 Drawing Figure

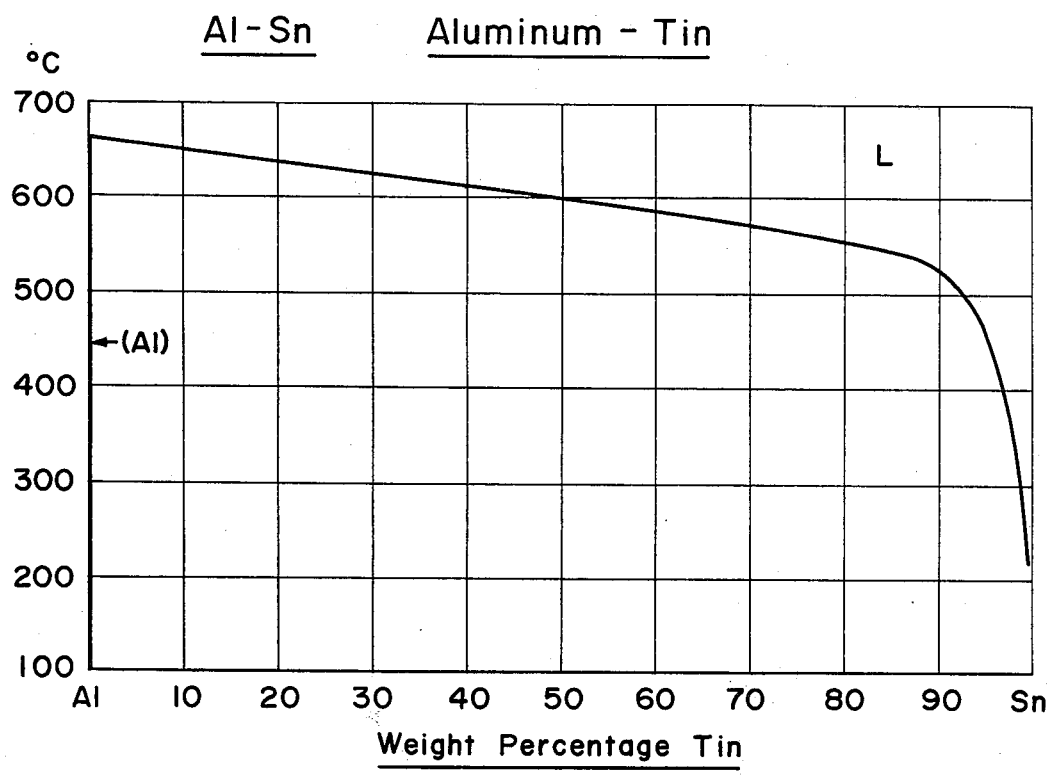

METHOD FOR PLATING METALLIC WORKPIECES, PARTICULARLY ALUMINUM

BACKGROUND OF THE INVENTION

This invention concerns a method of plating aluminum workpieces in the presence of ultrasonic agitation and more specifically has reference to a method wherein an aluminum workpiece is disposed in a body of molten metal maintained at an elevated temperature while the molten metal is subjected to sonic or ultrasonic energy. Exemplary of such a method is the placing of an aluminum workpiece into an ultrasonic apparatus comprising a pool of molten tin which is maintained at an elevated temperature and which is subjected to ultrasonic energy produced by electroacoustic or magnetostrictive transducers either coupled to the outside surface of the tank supporting the pool or by means of sonically activated horns contacting the pool.

As is known in the prior art, tinning of aluminum using tin or lead-tin alloys can be done most effectively by means of an ultrasonically activated bath. The ultrasonic energy displaces the tenacious oxide layer normally adhering to the aluminum surface and causes a clean oxide-free surface to which the tin adheres.

The above described process has received renewed attention in connection with the desire of producing parts, especially electrical conductors, made of aluminum rather than copper. Aluminum is not only less expensive, but is also more plentiful than copper ore.

Heretofore tinned electrical grade aluminum parts, such as buss bar or electrical wire, coated with pure tin or an alloy of lead-tin, have been afflicted with certain shortcomings which have caused the industry to reject the use of such tinned aluminum parts. In particular, when the coating was applied in the presence of ultrasonic activation, the coating failed to provide a strong metallurgical interface bond between the tin and the aluminum. The lack of such bond permitted continued oxidation of the aluminum surface resulting in the occurrence of cracks and even the flaking off of the tin coating.

One prior solution was to use a zinc aluminum (95/5) solder coating on the aluminum part. The solder coating, while forming a metallurgical bond with the aluminum part, also increased the electrical resistance of the finished product. As a result, the zinc-aluminum coated aluminum part has not been successful in many applications, for example as an electrical buss bar termination.

Another application comprises the coating of aluminum horns (also known as resonators, tools, mechanical amplitude transformers etc.) as used for transmitting sonic or ultrasonic vibrations from an electroacoustic transducer to a workpiece. In the past, such horns have been made from titanium. The price of this latter metal recently has tripled and, therefore, it has become more economical to utilize aluminum for those applications where the lower yield strength of aluminum as compared with titanium can be tolerated. However, aluminum exhibits a relatively soft surface and it is necessary to provide a harder finish, usually chrome plating, in order to reduce wear. In view of the fact that chrome cannot successfully be deposited, electrically or chemically, upon aluminum, an intermediate metal coating must be provided. Tin performs such a function. Unless there is an extremely tenacious bond between the aluminum and the tin, the high frequency cyclic expansions and contractions to which a horn is subjected cause a disruption of the bond between the tin and the aluminum and as a result, the chrome layer peels and flakes off. The rather expensive horn must then be replaced.

SUMMARY OF THE INVENTION

The present invention overcomes the heretofore encountered problems by making use of the phase diagrams of binary alloy systems. The temperature of the sonically activated plating bath is selected to provide a liquid alloy interface between the workpiece and the pool of molten metal. In the specific application where the plating bath comprises commercially pure tin and the aluminum is electrical grade aluminum, the pool is maintained at a temperature of at least 300°C. The result when the workpiece disposed in the bath reaches a temperature of 300°C is an interface alloy of approximately 98% Sn by weight and 2% Al. As the temperature increases, the percentage of aluminum in the resultant alloy increases. The creation of an alloy at the interface provides truly a metallurgical bond between the tin coating and the aluminum workpiece as contrasted with the adhesive bond provided heretofore.

BRIEF DESCRIPTION OF THE DRAWINGS

The FIGURE is a phase diagram of a typical binary alloy system, in the present case aluminum-tin.

DESCRIPTION OF THE INVENTION

The FIGURE depicts a phase diagram of binary alloy systems, in the present example aluminum-tin. The vertical axis indicates degrees of temperature, the horizontal axis identifies weight percentage of tin. The curve is the demarcation line between the solid and liquid phase. The area above the curve denotes a liquid state.

Hence, when an aluminum workpiece, substantially pure grade, is immersed in a pool of pure tin at 300°C, there will be produced an alloy of approximately 98% Sn by weight and 2% Al. Similarly, at 600°C the ratio will be 50/50.

In order to provide a tenacious bond between the surface metal and the material of the workpiece, it is desirable that at the transition area (interface) there be an alloy encompassing both metals. This is essentially a metallurgical bond as contrasted with an adhesive bond. In the case of an aluminum workpiece and a tin surface coating, a two to ten percent interface aluminum content has been found adequate.

Coating of an aluminum workpiece with tin, in accordance with the present invention, comprises the steps of providing a pool of substantially pure molten tin which is maintained at a temperature of not less than 300°C and immersing the workpiece in the pool of tin and awaiting the surface of the workpiece to attain a temperature of at least 300°C. Alternatively, the workpiece may be preheated prior to contact with the molten metal. While the workpiece is immersed in the pool high frequency vibrations in the sonic or ultrasonic frequency range (1 to 100 kHz) are applied to the pool for causing the molten metal to be agitated and scrub the aluminum workpiece surface free from oxide to achieve an oxide free metallurgical interface alloy, and withdrawing the workpiece from the tin pool.

Additional decorative or hard metallic surface layers, such as hard chrome, can then be applied to the outer tin coating as is well-known in the art. The high frequency vibrations can be applied to the molten metal pool simultaneously with the immersion of the workpiece in the molten metal bath, or after the workpiece has been brought into contact with the plating bath. The failure of providing high frequency vibrations when using the aluminum and tin combination causes the absence of a proper bond due to the prevailing oxide layer.

The fluxless coating of aluminum with solder using high frequency vibrations in the sonic or ultrasonic frequency range has been disclosed, for instance, by Barwich, U.S. Pat. No. 2,397,400, dated Mar. 26, 1946.

Tests conducted for evaluation purposes on electrical grade aluminum parts which have been plated in accordance with the teachings of the present invention with reflow oil have shown that an improved metallurgical bond is manifest at the interface of the two metals. Workpieces having a first layer of tin, plated in accordance with this test method, are placed in a second pool of molten tin having a layer of oil floating thereon for plating a second layer of tin upon the workpiece. The reflow oil floating on the molten tin strips away any tin which has not formed a sound metallurgical bond with the aluminum workpiece. Tests conducted on parts plated with tin/aluminum alloys using commercially pure tin which is applied at a temperature below the phase curve exhibited a significant amount of peeling, stripping and cracking of the coating when contacted with the reflow oil. In comparison, the aluminum parts coated with ultrasonically agitated tin at temperatures of 300°C or higher failed to exhibit peeling or stripping when subjected to the same test conditions.

In another application, aluminum wire of 0.375 inches (9.5 mm) diameter was coated with tin in accordance with the process described above. The cross-section of the wire was then reduced by consecutive drawing processes to a final diameter of 0.135 inches (3.5 mm). No flaking or peeling of the tin coating was discernible.

It will be observed that the present invention provides a significant improvement over the plating methods known heretofore.

What is claimed is:

1. A method of applying a tin plating upon an aluminum workpiece comprising the steps of:

maintaining a pool of molten tin at a temperature of at least 300°C for causing an alloy to be formed between the aluminum workpiece and the tin;

disposing the aluminum workpiece in said pool for a period of time sufficient for causing the surface of the workpiece to attain said temperature, and providing high frequency vibratory energy in the sonic or ultrasonic frequency range to said pool while said workpiece is disposed in said molten tin.

2. A method of applying a tin plating upon an aluminum workpiece as set forth in claim 1, said alloy formed comprising between 2 and 10 percent aluminum by weight.

3. A method of applying a tin plating upon an aluminum workpiece as set forth in claim 1, said aluminum workpiece being electrical grade aluminum and said tin being commercial grade pure tin.

4. A method of applying a tin plating upon an aluminum workpiece as set forth in claim 1, said aluminum workpiece being a horn for transmitting vibratory energy and said tin being commercial grade pure tin.

5. A method of applying a tin plating upon an aluminum workpiece comprising the steps of:

preheating the aluminum workpiece;

maintaining a pool of molten tin at a temperature of at least 300°C for causing an alloy to be formed between said aluminum workpiece and the tin;

disposing said aluminum workpiece in said pool for a period of time sufficient to cause the surface of the workpiece to be at a temperature at which an alloy with said tin is formed;

providing high frequency vibratory energy to said pool while said workpiece is in contact with said molten tin, and removing said workpiece from said pool.

6. A method of applying a tin plating upon an aluminum workpiece as set forth in claim 5, said alloy formed comprising between two and ten percent aluminum by weight.

7. A method of applying a tin plating upon an aluminum workpiece as set forth in claim 5, said aluminum workpiece being made from electrical grade aluminum and said molten tin being commercial grade pure tin.

8. A method of applying a tin plating upon an aluminum workpiece as set forth in claim 5, said workpiece being a horn for transmitting vibratory energy.

* * * * *